(12) United States Patent
Hara

(10) Patent No.: US 10,207,573 B2
(45) Date of Patent: Feb. 19, 2019

(54) BATTERY MOUNTING STRUCTURE FOR VEHICLE

(71) Applicant: TOYOTA JIDOSHA KABUSHIKI KAISHA, Aichi (JP)

(72) Inventor: Yasuhiro Hara, Odawara (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 15/488,031

(22) Filed: Apr. 14, 2017

(65) Prior Publication Data

US 2017/0305249 A1 Oct. 26, 2017

(30) Foreign Application Priority Data

Apr. 21, 2016 (JP) .................. 2016-085564

(51) Int. Cl.
*B60K 1/04* (2006.01)
*B60L 11/18* (2006.01)
*B62D 25/20* (2006.01)
*H01M 2/10* (2006.01)

(52) U.S. Cl.
CPC ........... *B60K 1/04* (2013.01); *B60L 11/1877* (2013.01); *B62D 25/20* (2013.01); *B62D 25/2036* (2013.01); *H01M 2/1077* (2013.01); *H01M 2/1083* (2013.01); *B60K 2001/0438* (2013.01); *H01M 2220/20* (2013.01)

(58) Field of Classification Search
CPC ............. B60K 1/04; B60K 2001/0438; B60L 11/1877; B60L 11/1879; B62D 25/20; H01M 2/1077; H01M 2/10; H01M 2/1083; H01M 2/1072; H01M 2220/20
See application file for complete search history.

(56) References Cited

U.S. PATENT DOCUMENTS

| | | | | |
|---|---|---|---|---|
| 5,501,289 | A * | 3/1996 | Nishikawa | B60K 1/04 180/65.1 |
| 7,654,352 | B2 * | 2/2010 | Takasaki | B60K 1/04 180/65.1 |
| 8,336,658 | B2 * | 12/2012 | Rawlinson | B60N 2/012 180/65.1 |
| 8,387,733 | B2 * | 3/2013 | Nakamura | B60K 1/04 180/68.1 |
| 9,227,582 | B2 * | 1/2016 | Katayama | B60K 1/04 |

(Continued)

FOREIGN PATENT DOCUMENTS

| | | |
|---|---|---|
| JP | H6-219336 A | 8/1994 |
| JP | 2014-216096 A | 11/2014 |

(Continued)

*Primary Examiner* — James A Shriver, II
*Assistant Examiner* — Steve Clemmons
(74) *Attorney, Agent, or Firm* — Hauptman Ham, LLP

(57) ABSTRACT

A battery mounting structure for maintaining a sufficient passenger compartment in vehicles is provided. The battery mounting structure comprises a pair of longitudinal side sills (11, 12), and a battery pack (7) disposed between the side sills (11, 12). A plurality of battery modules (9) are juxtaposed in a casing (8) of the battery pack (7). A linear depression (39) protrudes downwardly from a reinforcement member (15) situated underneath a floor panel (17) supported by the side sills (11, 12), and the battery pack (7) has a linear depression (38) hold the linear depression (39) therein.

12 Claims, 11 Drawing Sheets

(56) References Cited

U.S. PATENT DOCUMENTS

| | | | |
|---|---|---|---|
| 9,359,742 B2* | 6/2016 | Adachi | H01G 11/10 |
| 9,533,600 B1* | 1/2017 | Schwab | B60L 11/1879 |
| 9,566,859 B2* | 2/2017 | Hatta | B60K 11/06 |
| 9,722,223 B1* | 8/2017 | Maguire | H01M 2/1083 |
| 2013/0088044 A1 | 4/2013 | Charbonneau et al. | |
| 2013/0229030 A1* | 9/2013 | Yamaguchi | B60K 1/04 |
| | | | 296/193.07 |
| 2014/0284125 A1 | 9/2014 | Katayama et al. | |
| 2014/0329125 A1* | 11/2014 | Miyanaga | B60R 13/0861 |
| | | | 429/100 |
| 2015/0053493 A1* | 2/2015 | Kees | B60K 1/04 |
| | | | 180/68.5 |

FOREIGN PATENT DOCUMENTS

| | | | |
|---|---|---|---|
| KR | 20120050234 A * | 5/2012 | |
| WO | 2013/073464 A1 | 5/2013 | |

* cited by examiner

BATTERY MOUNTING STRUCTURE FOR VEHICLE

CROSS REFERENCE TO RELATED APPLICATIONS

The present application claims the benefit of priority to Japanese Patent Application No. 2016-085564 filed on Apr. 21, 2016 with the Japanese Patent Office, the entire contents of which are incorporated herein by reference in its entirety.

BACKGROUND

Field of the Disclosure

Embodiments of the present application relate to the art of a structure for mounting a battery for storing electrical energy in a vehicle Discussion of the Related Art U.S. Pat. No. 8,702,161 describes a system for absorbing and distributing side impact energy utilizing an integrated battery pack and side sill assembly. According to the teachings of U.S. Pat. No. 8,702,161, a floor panel is disposed between a pair of side sills extending longitudinally, and the battery pack is disposed underneath the floor panel between the side sills. In order to enhance rigidity of the floor panel, a plurality of vehicle cross-members having a rectangularly-shaped cross section are coupled to the inner side sill walls of the left and right hand side sill assemblies on the floor panel.

However, according to the teachings of U.S. Pat. No. 8,702,161, the vehicle cross-members protrude upwardly toward the passenger compartment on the floor panel and hence the passenger compartment may be restricted.

SUMMARY

Aspects of the present disclosure have been conceived noting the foregoing technical problems, and it is therefore an object of the present disclosure is to provide a battery mounting structure for maintaining a sufficient passenger compartment in vehicles.

Embodiments of the present disclosure relate to a battery mounting structure for a vehicle, comprising: a pair of frame members extending in a longitudinal direction of the vehicle while maintaining a predetermined clearance therebetween in a width direction of the vehicle; and a battery pack disposed between the frame members. In order to achieve the above-explained objective, according to the present disclosure, the battery mounting structure is provided with a floor panel supported by the frame members, and a first reinforcement member having a linear depression protruding downwardly that is disposed underneath the floor panel. Specifically, the battery pack is situated underneath the floor panel, and the battery pack includes a linear depression to which the linear depression of the first reinforcement member is fitted.

In a non-limiting embodiment, the battery pack may includes a cell stack formed of a plurality of single cells that is disposed on both sides of the linear depression of the battery pack. The first reinforcement member may include a cross member extending between the frame members in a width direction of the vehicle, and a longitudinal floor member extending between the frame members in a longitudinal direction of the vehicle. In addition, a plurality of the first reinforcement member may be arranged in the vehicle at predetermined intervals, and the cell stacks may be arranged between the first reinforcement member.

In a non-limiting embodiment, the first reinforcement member may be integrated with the floor panel. The battery mounting structure may further comprise a second reinforcement member extending along the linear depression of the battery pack in a casing of the battery pack. The second reinforcement member, the linear depression of the battery pack and the first reinforcement member may be fixed to one another by a fixing member. Optionally, the second reinforcement member may be integrated with the casing.

In a non-limiting embodiment, the cell stack may include a solid electrolyte, and the battery pack may be fixed to the frame members in such a manner that the single cells are juxtaposed in the width direction of the vehicle. Specifically, the battery pack may include a battery module comprising a pair of end plates holding the cell stack from both ends, and a bundling member connecting the end plates to bundle the cell stack between the end plates. the battery module may be arranged in such a manner that and one of the end plates extends parallel to an sidewall of the casing.

Thus, according to the embodiment of the present disclosure, Specifically, the battery pack is situated underneath the floor panel supported by the frame members, and the linear depression of the first reinforcement member is fitted into the linear depression of the battery pack. According to the embodiment of the present disclosure, therefore, a passenger compartment may be ensured sufficiently in the vehicle.

Since the cell stacks are disposed on both sides of the linear depression of the battery pack, a height of the call stack is not restricted by the linear depression protruding downwardly from the floor panel. According to the embodiment of the present disclosure, therefore, the cell stack of large capacity may be arranged underneath the floor panel. In other words, since a capacity of the cell stack can be increased without protruding downwardly, a vehicle height may be raised.

Since the first reinforcement member may be arranged not only in the width direction but also in the longitudinal direction of the vehicle, rigidity of a bottom structure of the vehicle may be enhanced not only in the width direction but also in the longitudinal direction.

Since a plurality of the first reinforcement member may be arranged in the vehicle, rigidity of the bottom structure of the vehicle may be further enhanced.

Since the first reinforcement member may be integrated with the floor panel, fixing members to fix the first reinforcement member to the floor panel may be omitted.

Since the battery mounting structure further comprises the second reinforcement member, rigidity of the battery pack may be enhanced. In addition, the second reinforcement member, the linear depression of the battery pack and the first reinforcement member may be fixed to one another by a fixing member.

Since the second reinforcement member may be integrated with the casing, fixing members to fix the second reinforcement member to the casing may be omitted.

Since the battery pack are fixed to the frame members in such a manner that the single cells are juxtaposed in the width direction of the vehicle, an impact load applied to the frame member may be transmitted to the battery packs serving as reinforcement members. In addition, since the battery module comprises the end plates and the bundling member, rigidity of the battery pack may be further enhanced.

Since the battery modules are arranged in such a manner that one of the end plates extends parallel to the sidewall of the casing, the impact load applied to the frame member may be transmitted certainly to the battery packs. For this reason, rigidity of the vehicle body may be further enhanced.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
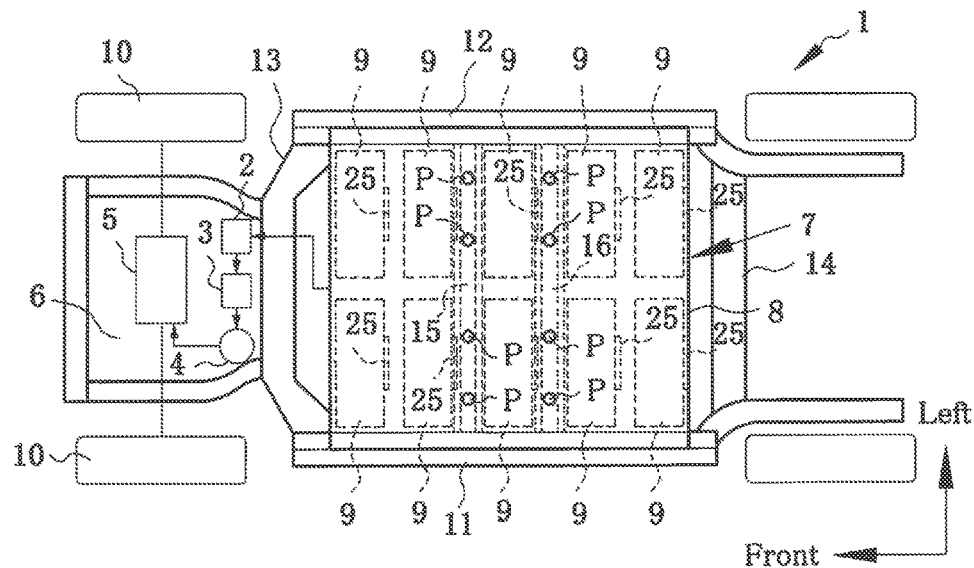
FIG. 1 is a schematic illustration showing one example of a bottom structure of the vehicle to which the battery mounting structure according to the present disclosure is applied.

Hereinafter, embodiments of the present disclosure will be explained with reference to the accompanying drawings. Turning now to FIG. 1, there is shown one example of a bottom structure of a vehicle to which the battery mounting structure according to the present disclosure is applied. In the vehicle 1 shown in FIG. 1, a converter 2, an inverter 3, a motor 4, and a power transmission unit 5 are arranged in a front compartment 6, and a battery pack 7 as a secondary battery is arranged under a floor panel 17. The battery pack 7 includes a cuboid casing 8 and a plurality of battery modules 9 individually formed of a stack of single cells. In the casing 8, five sets of the battery modules 9 are juxtaposed to form a right array, and five sets of the battery modules 9 are juxtaposed to form a left array. The converter 2 is adapted to increase a voltage from the battery modules 9, and to apply the voltage to the inverter 3 while stabilizing. The inverter 3 converts the direct current supplied from the battery modules 9 into the alternate current while controlling frequency. The power transmission unit 5 transmits torque of the motor 4 to front wheels 10 while increasing or decreasing. Here, the inverter 3 may also be connected directly to the battery modules 9 while omitting the converter 2.

In the vehicle 1, a front end of a right side sill 11 extending in the right side is joined to a right end of a transversely extending front cross member 13, and a rear end of the right side sill 11 is joined to a right end of a transversely extending rear cross member 14. Likewise, a front end of a left side sill 12 is joined to a left end of the front cross 13, and a rear end of the left side sill 12 is joined to a left end of the rear cross 14. In addition, a first intermediate cross member 15 and a second intermediate cross member 16 extend laterally between the right side sill 11 and the left side sill 12, and right ends of the cross members 15 and 16 are attached to the right side sill 11 and left ends of the cross members 15 and 16 are attached to the left side sill 12.

That is, the floor panel 17 is supported by the first intermediate cross member 15 and the second intermediate cross member 16 from below, and the first intermediate cross member 15 and the second intermediate cross member 16 also serve as reinforcement members against a collision impact applied from the side of the vehicle 1. The battery pack 7 is disposed between the right side sill 11 and the left side sill 12 extending substantially parallel to each other. Specifically, the first intermediate cross member 15 extends laterally between the second and third rows of the battery modules 9 from the front, and the second intermediate cross member 16 extends laterally between the third and fourth rows of the battery modules 9 from the front. The battery pack 7 is attached to the first intermediate cross member 15 and the second intermediate cross member 16 at eight fixing points P by bolts.

Number of the battery modules 9 in each array may be altered arbitrarily according to need. In the battery mounting structure, the right side sill 11 and the left side sill 12 individually serve as a frame member, and the first intermediate cross member 15 and the second intermediate cross member 16 individually serve as a first reinforcement member.

Figure 2:
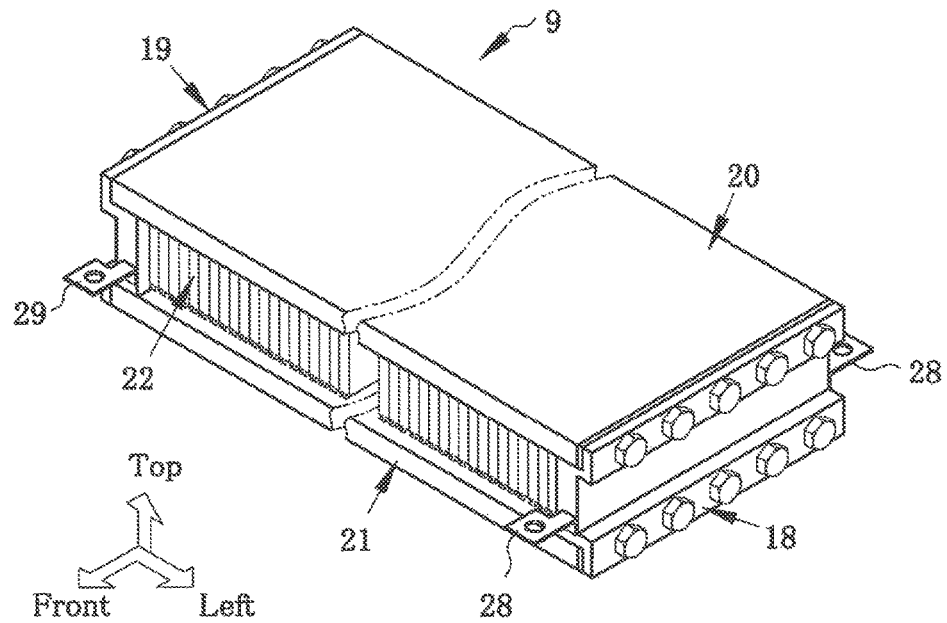
FIG. 2 is a perspective view showing one example of the battery module.

FIG. 2 is a perspective view showing one example of a structure of the battery module 9. As illustrated in FIG. 2, the battery module 9 comprises a first end plate 18, a second end plate 19, a first tension plate 20, a second tension plate 21, and a cell stack 22. Thus, each of the battery modules 9 has a cuboid shape, and individually arranged in the battery pack 7 in such a manner that the long sides extend in the width direction of the vehicle 1 and that the first end plate 18 and the second end plate 19 extend in the longitudinal direction of the vehicle 1.

Figure 3:
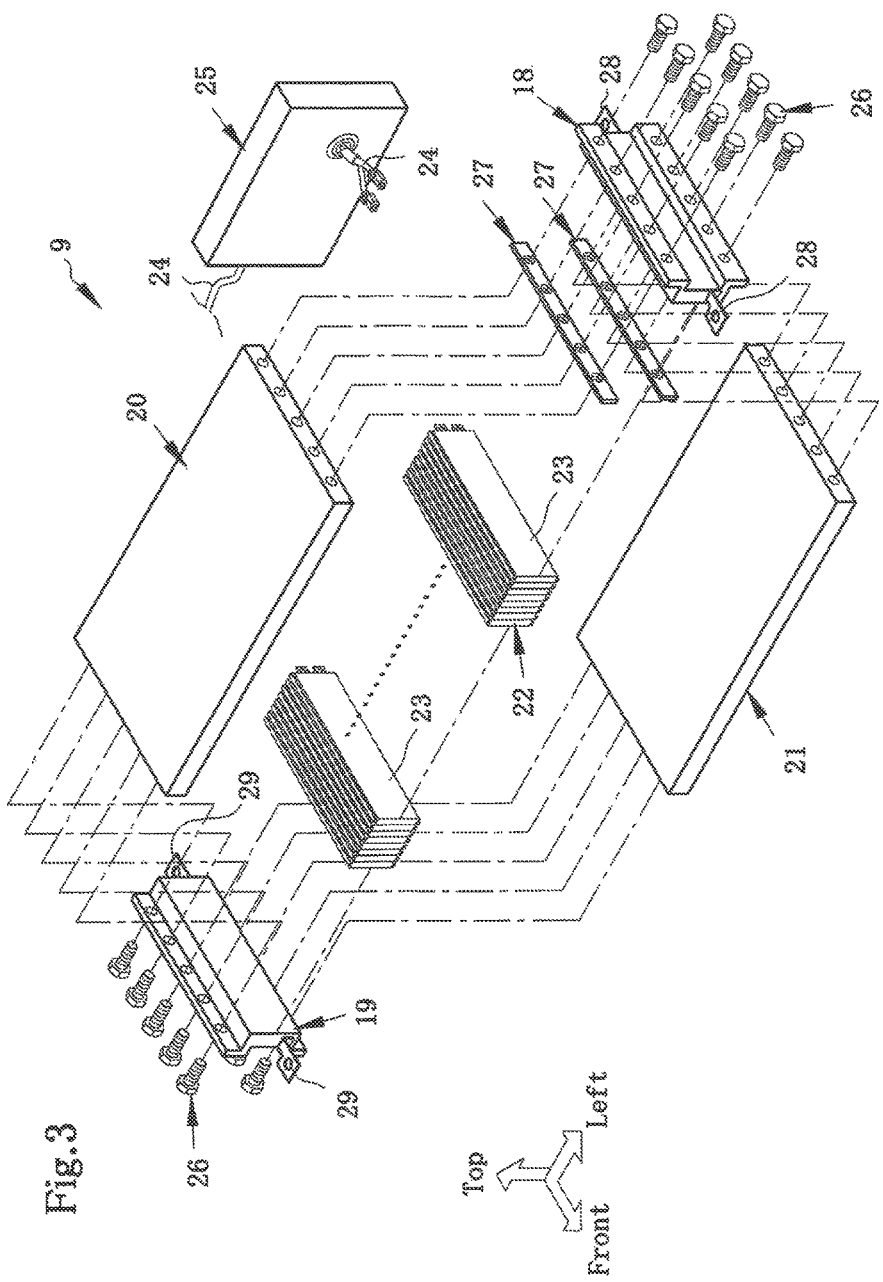
FIG. 3 is an exploded view of the battery module shown in FIG. 2.

Components of the battery module 9 as an all-solid battery are shown in FIG. 3 in more detail. As illustrated in FIG. 3, the cell stack 22 is formed of a plurality of flat rectangular single cells 23 juxtaposed in the width direction of the vehicle 1. Although the single cells 23 are juxtaposed in the width direction of the vehicle 1 in FIG. 3, the direction to juxtapose the single cells 23 should not be limited to the specific direction.

Each of the single cell 23 includes a pair of electrodes and a solid electrolyte interposed between the electrodes (neither of which are shown). The single cells 23 forming the cell stack 22 are connected in series through a cable 24, and the battery module 9 outputs electrical power in accordance with the number of the single cells 23 through a pair of electrodes exposed to outside. Here, in FIG. 3, only a part of the cable 24 is depicted for the sake of illustration. The single cells 23 are electrically connected with a battery ECU 25 through the cable 24, and the battery ECU 25 is configured to stabilize the power output of the single cell 23 while observing voltage. As illustrated in FIG. 1, specifically, the battery ECU 25 is attached to a front face or a rear face of the battery module 9 in the longitudinal direction of the vehicle 1. As described, the right array of the battery modules 9 and the left array of the battery modules 9 are connected in parallel with each other to achieve a required capacity of the battery pack 7 to operate the motor 4.

The first end plate 18 and the second end plate 19 are made of solid material, and situated on both width ends of the cell stack 22. The first tension plate 20 is attached to the first end plate 18 and the second end plate 19 above the cell stack 22 by screwing bolts 26 into bores of the first end plate 18 and the second end plate 19. Likewise, the second tension plate 21 is attached to the first end plate 18 and the second end plate 19 below the cell stack 22 by screwing bolts 26 into bores of the first end plate 18 and the second end plate 19. In order to adjust a clamping force for bundling the cell stack 22 by the first end plate 18 and the second end plate 19, a shim 27 is individually interposed between the first end plate 18 and the first tension plate 20, and between the first end plate 18 and the second tension plate 21. To this end, a thickness of the shim 27 may be adjusted in such a manner as to achieve a desired clamping force.

Since the solid electrolyte is employed in the battery module 9, liquid spill will not occur in the battery module 9. In addition, since most of the components of the battery module 9 are made of solid material, a shock resistance of the battery module 9 is enhanced. The first end plate 18 is provided with a pair of fixing plates 28 at both ends and the second end plate 19 is provided with a pair of fixing plates 29 at both ends so that the battery module 9 is fixed to the casing 8 made of insulation material through the fixing plates 28 and 29. Thus, in the battery module 9, the first tension plate 20, the second tension plate 21, and the bolts 26 serve as a bundling member.

Figure 4:
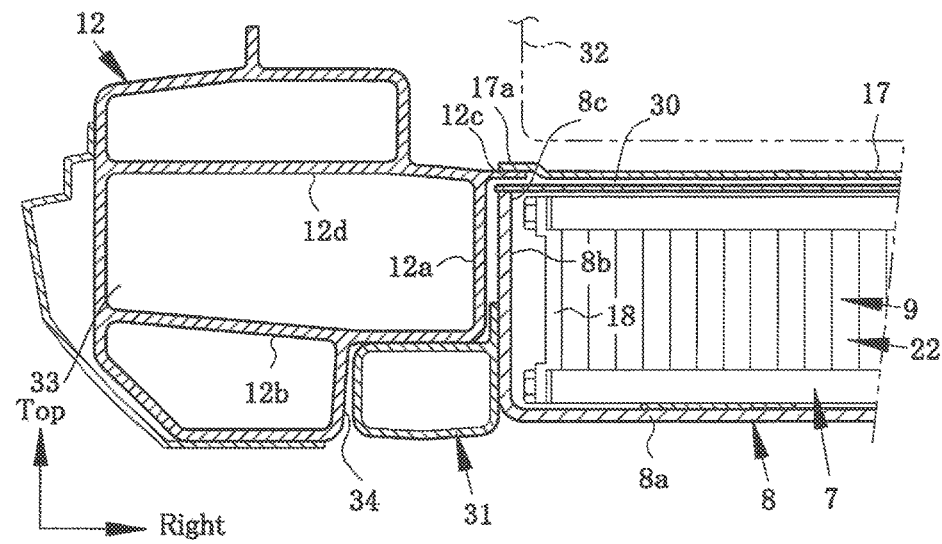
FIG. 4 is a cross-sectional view showing cross-sections of a connection between the side sill and the battery pack.

Turning to FIG. 4, there is shown cross-sections of the left array of the battery modules 9 and the left side sill 12. As illustrated in FIG. 4, the battery pack 7 includes the casing 8 and the battery modules 9. The casing 8 includes a bottom 8a on which the battery modules 9 are disposed, a sidewall 8b, and a lid 30 closing an opening 8c of the casing 8. A hollow reinforcement frame 31 having a rectangular cross-section is attached to an outer face of the sidewall 8b of the casing 8 at a left lower corner between the sidewall 8b and the bottom 8a, and a length of the reinforcement frame 31 is identical to or slightly shorter than that of the sidewall 8b of the casing 8. Likewise, the reinforcement frame 31 is also attached to the outer face of the sidewall 8b of the casing 8 at a right lower corner between the other sidewall 8b and the bottom 8a. Optionally, although not especially shown in the drawings, the reinforcement frame 31 may also be attached to outer faces of a front wall and a rear wall of the casing 8 to enclose a lower portion of the sidewall 8b of the casing 8.

In the casing 8, the first end plate 18 of each of the battery modules 9 and the sidewall 8b of the casing 8 extend in the vertical direction substantially parallel to each other, and an inner sidewall 12a of the left side sill 12 and the sidewall 8b of the casing 8 extend in the vertical direction substantially parallel to each other. That is, the sidewall 8b of the casing 8 is overlapped with at least a portion of the left side sill 12, e.g., with the inner sidewall 12a in the vertical direction of the vehicle 1. The right side sill 11 is also fixed to the right side of the battery pack 7 in a similar fashion. According to the example shown in FIG. 4, therefore, a collision impact applied to the left side sill 12 from the side of the vehicle 1 may be transmitted certainly and efficiently to the cell stack 22. For this reason, an inward deformation of the side sill toward a passenger compartment 32 may be reduced even if the collision impact is applied to the side sill from the side of the vehicle 1.

In order to lighten the vehicle weight while ensuring rigidity, each of the right side sill 11 and the left side sill 12 may be formed using light aluminum alloy by an extrusion method in such a manner as to maintain a hollow space 33 therein. A lower inner corner of the left side sill 12 is depressed to form a depression 34 to be engaged with the reinforcement frame 31 fixed to the casing 8, and at least an upper face of the reinforcement frame 31 is fixed to a lower partition 12b of left side sill 12 by an appropriate means such as welding. Since the left side sill 12 is thus combined with the reinforcement frame 31, rigidity of the left side sill 12 against the impact applied from the side of the vehicle 1 may be enhanced, and the impact applied to the left side sill 12 is effectively transmitted to the battery pack 7 serving as a reinforcement member.

The floor panel 17 is situated above the lid 30 of the battery module 9. Specifically, a left side end 17a of the floor panel 17 is disposed on an inner flange 12c protruding inwardly from an upper partition 12d of the left side sill 12, and a right side end (not shown) of the floor panel 17 is disposed on an inner flange protruding inwardly from un upper partition (neither of which are shown) of the right side sill 11. Optionally, the floor panel 17 may be formed of a plurality of layers.

Figure 5:
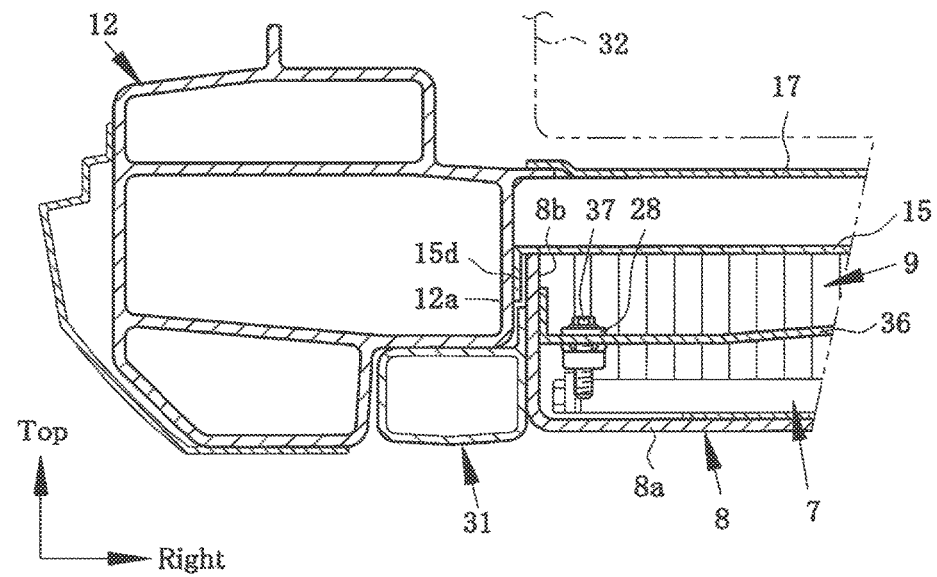
FIG. 5 is a cross-sectional view showing a cross-section of a first intermediate cross member.

Turning to FIG. 5, there is shown cross-sections of the first intermediate cross member 15 in the width direction of the vehicle 1. As illustrated in FIG. 5, a left end 15d of the first intermediate cross member 15 is bent downwardly to be attached to the inner sidewall 12a of the left side sill 12. Although not especially shown in the drawings, a right end 15d of the right side is also bent downwardly to be attached to the inner sidewall of the right side sill 11. The fixing plates 28 of the first end plate 18 are fixed to a left end of a battery reinforcement member 36 as a second reinforcement member fixed to the sidewall 8b of the casing 8 by bolts 37. A right end of the battery reinforcement member 36 is also fixed to the sidewall 8b of the right side, and the fixing plates 29 of the second end plate 19 are also fixed to the right end of the battery reinforcement member 36.

Figure 6:
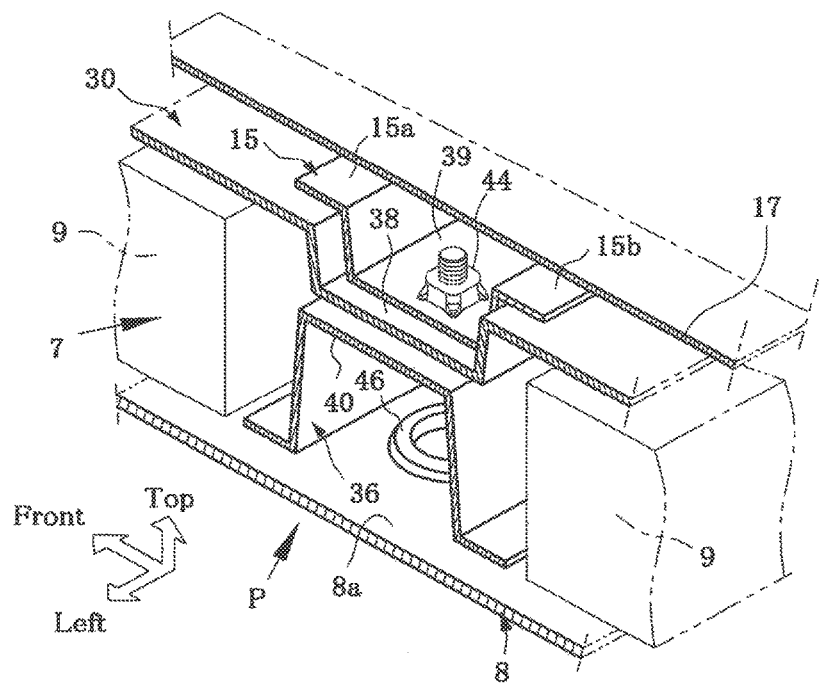
FIG. 6 is a perspective view showing the first intermediate cross member and the battery pack.

FIG. 6 is a perspective view showing the first intermediate cross member 15 and the battery reinforcement member 36. As illustrated in FIG. 6, a linear depression 38 having a rectangular cross-section is formed on the lid 30 between the battery modules 9. That is, the linear depression 38 extends in the width direction of the vehicle 1 between the battery modules 9.

The first intermediate cross member 15 is also provided with a linear depression 39 having a rectangular cross-section. Specifically, the linear depression 39 is formed by depressing the first intermediate cross member 15 in the width direction in such a manner as to fit the linear depression 39 into the linear depression 38 of the lid 30. Consequently, a front flange 15a and a rear flange 15b are formed across the linear depression 39, and the front flange 15a and the rear flange 15b are fixed to a lower face of the floor panel 17. Although not especially shown in FIG. 6, the second intermediate cross member 16 has a same structure as the first intermediate cross member 15.

Figure 7:
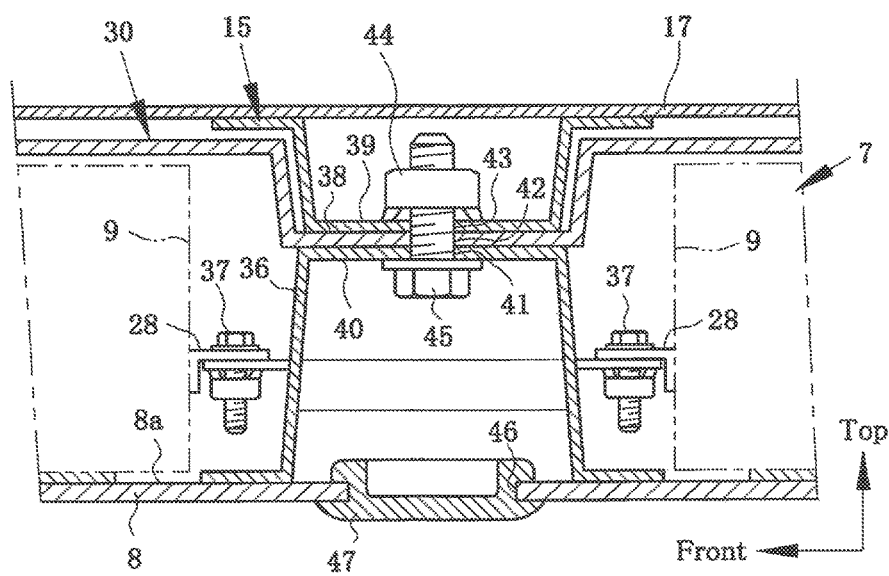
FIG. 7 is a cross-sectional view showing cross-sections of the first intermediate cross member and the battery pack shown in FIG. 6.

FIG. 7 shows cross-sections of the first intermediate cross member 15 and the battery reinforcement member 36. As described, the linear depression 39 of the first intermediate cross member 15 is fitted into the linear depression 38 of the lid 30. Since the floor panel 17 is supported by the first intermediate cross member 15 from below, rigidity of the floor panel 17 is enhanced. As illustrated in FIG. 7, an upper face of the lid 30 is flat.

The battery reinforcement member 36 also extends in the width direction of the vehicle 1 underneath the first intermediate cross member 15, and a protrusion 40 protruding toward the linear depression 39 of the first intermediate cross member 15 is formed in the width direction. A front end and a rear end of the battery reinforcement member 36 are fixed to the bottom 8a of the casing 8. An installation hole 41 is formed on a top wall of the protrusion 40, an installation hole 42 is formed on a bottom wall of the linear depression 38 of the lid 30, and an installation hole 43 is formed on a bottom wall of the linear depression 39 of the first intermediate cross member 15. In addition, a weld nut 44 is welded on an upper face of the linear depression 39 around the installation hole 43. Accordingly, the first intermediate cross member 15, the lid 30, and the battery reinforcement member 36 are fixed to one another by screwing a bolt 45 as a fixing member into the weld nut 44 through the installation holes 41, 42 and 43. To this end, an opening 46 is formed on the bottom 8a of the casing 8 underneath the installation holes 41, 42 and 43, and the opening 46 is closed by a grommet 47 after screwing a bolt 45 into the weld nut 44. Since the first intermediate cross member 15 is situated underneath the floor panel 17 while being depressed downwardly, the floor panel 17 may be maintained in a flat shape.

Figure 8:
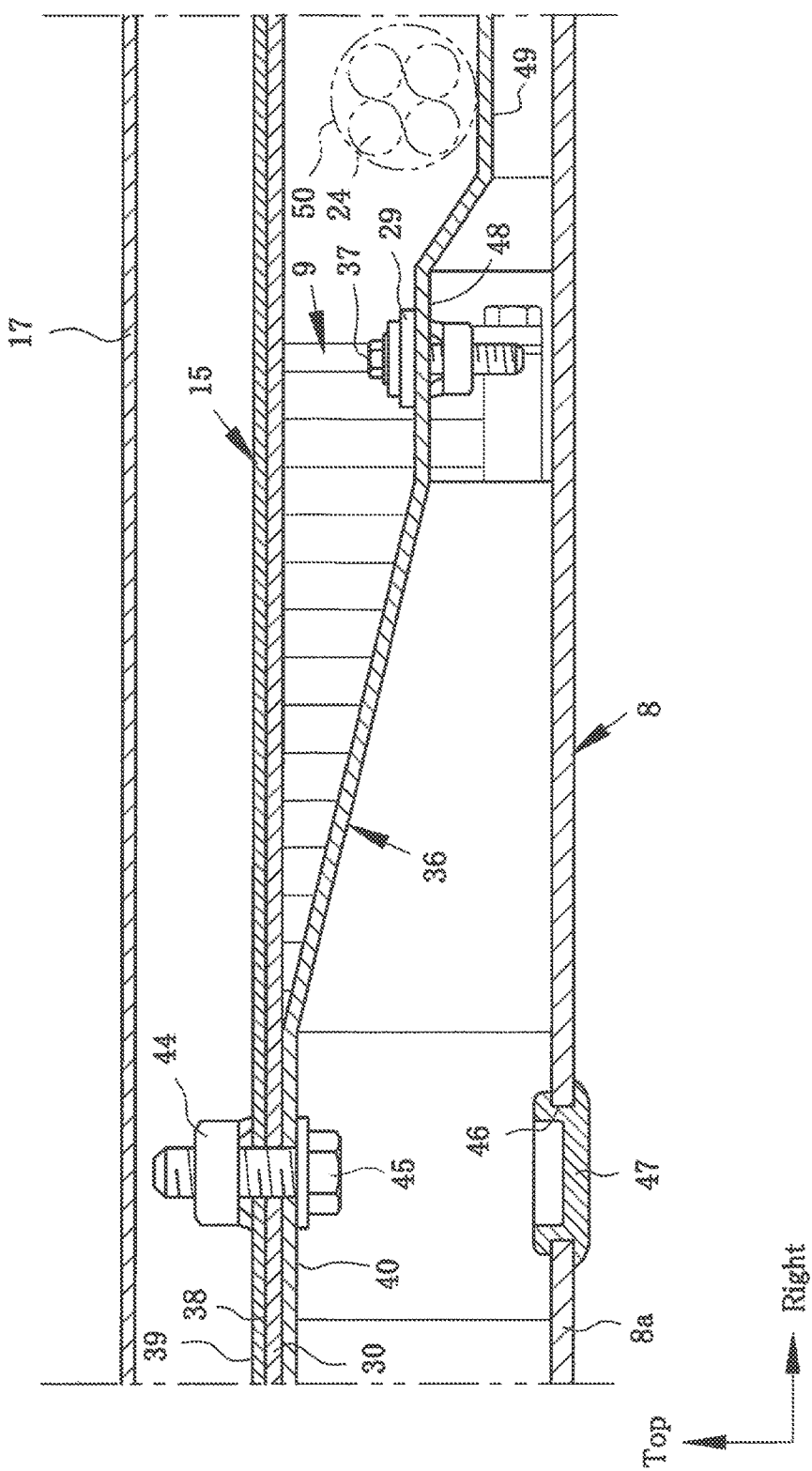
FIG. 8 is a cross-sectional view showing a cross-section of a battery reinforcement member in a width direction of the vehicle.

FIG. 8 shows a cross-section of the battery reinforcement member 36 in the width direction of the vehicle 1. As shown in FIG. 8, the battery reinforcement member 36 is bent downwardly from the protrusion 40, and an intermediate flat wall 48 and a lower flat wall 49 are formed stepwise toward the width center of the vehicle 1. Although not especially shown in FIG. 8, a pair of installation plates is protruded longitudinally from the intermediate flat wall 48 to be overlapped with the fixing plates 29 of the second end plate 19, and each of the installation plate is individually fixed to the fixing plates 29 by the bolt 37. The lower flat wall 49 expands in the width center of the vehicle 1 between the battery modules 9 in the right array and the left array, and a cylindrical protector 50 covering the above-mentioned cable 24 extends longitudinally above the lower flat wall 49 to connect the battery modules 9. The battery reinforcement member 36 is also attached to the second intermediate cross member 16 in a similar fashion.

Figure 9:
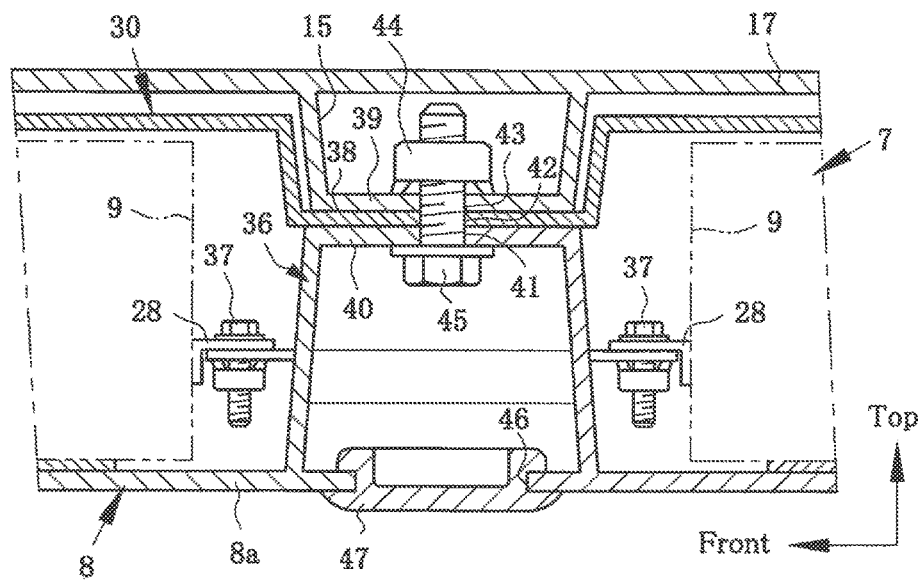
FIG. 9 is a cross-sectional view showing a cross section of the intermediate cross member integrated with the floor panel.

Turning to FIG. 9, there is shown an example of forming the intermediate cross member integrally with the floor panel. As illustrated in FIG. 9, the intermediate cross member 15 is formed on the lower face of the floor panel 17 in such a manner as to protrude downwardly. As the example shown in FIG. 7, the first intermediate cross member 15, the lid 30, and the battery reinforcement member 36 are fixed to one another by screwing the bolt 45 into the weld nut 44 welded to a bottom of the linear depression 39 through the installation holes 41, 42 and 43. In addition, as illustrated in FIG. 9, the battery reinforcement member 36 may also be integrated with the bottom 8a of the casing 8. The remaining structures are similar to those of the example shown in FIG. 7. In the following explanation, common reference numerals are allotted to in common with those of the foregoing example, and detailed explanation for the common elements will be omitted.

Figure 10:
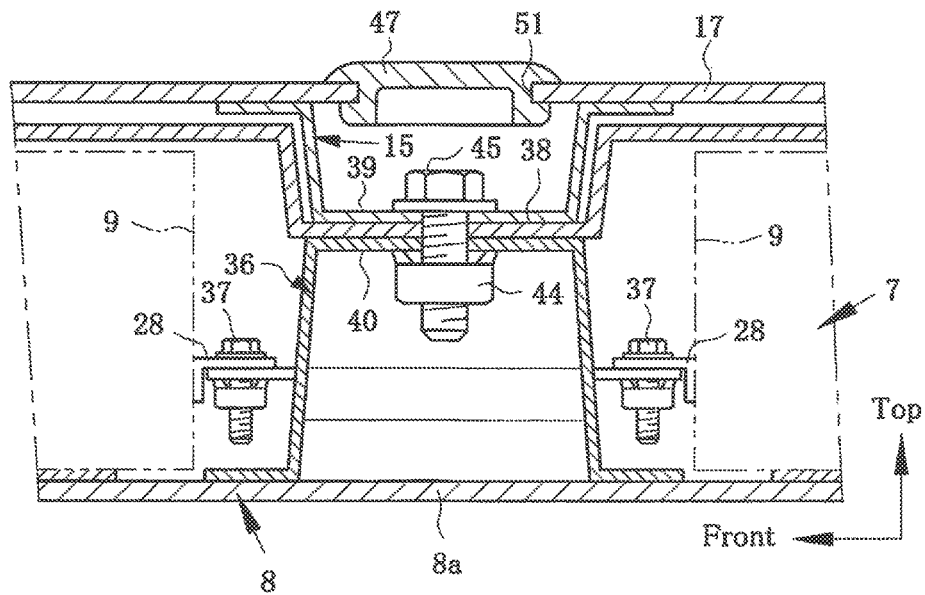
FIG. 10 is a cross-sectional view showing an example in which the battery pack is fixed by screwing a blot from above.

Turning to FIG. 10, there is shown an example of screwing the bolt 45 into the weld nut 44 from above. In the example shown in FIG. 10, an opening 51 is formed on the floor panel 17, and the weld nut 44 is welded to a lower face of a top wall of the protrusion 40 formed in the battery reinforcement member 36. In order to fix the first intermediate cross member 15, the lid 30, and the battery reinforcement member 36 to one another, the bolt 45 is screwed into the weld nut 44 through the opening 51 of the floor panel 17 and the installation holes 41, 42 and 43. After screwing the bolt 45 into the weld nut 44, the opening 51 of the floor panel 17 is closed by the grommet 47. According to the example shown in FIG. 10, since the opening is not formed on the bottom 8a of the casing 8, water intrusion and dust intrusion into the casing 8 may be prevented certainly. The remaining structures are similar to those of the example shown in FIG. 7.

Although the first intermediate cross member 15 and the second intermediate cross member 16 are arranged between the right side sill 11 and the left side sill 12 in the foregoing examples, number of the intermediate cross member may be changed according to need.

In addition, although the first intermediate cross member 15 and the second intermediate cross member 16 extend in the width direction of the vehicle 1, a longitudinal reinforcement member may also be arranged in the vehicle 1 instead of the first intermediate cross member 15 and the second intermediate cross member 16.

Figure 11:
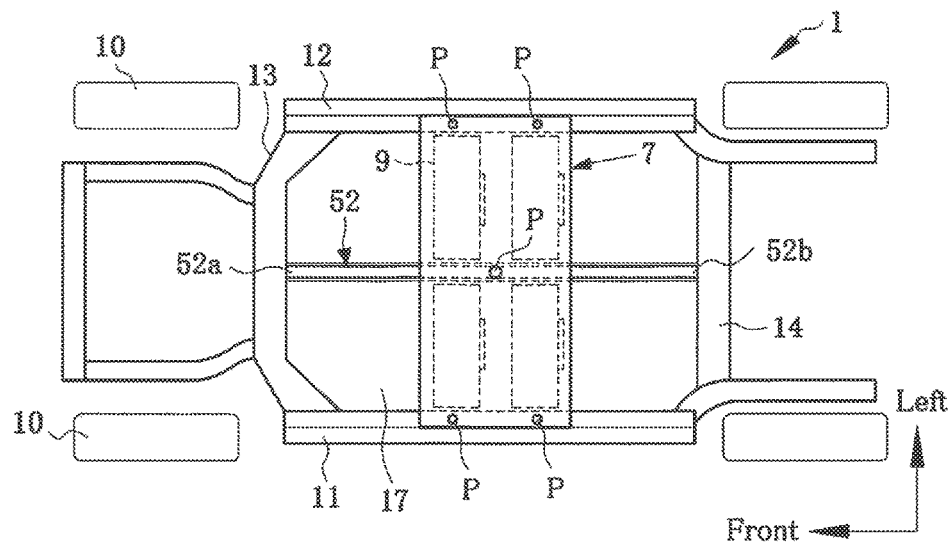
FIG. 11 is a schematic illustration showing an example of arranging a longitudinal floor member in the vehicle.

FIG. 11 shows another example of the bottom structure of in which a longitudinal floor member 52 also serving as the first reinforcement member is arranged between the right side sill 11 and the left side sill 12. As illustrated in FIG. 11, the longitudinal floor member 52 is arranged underneath the floor panel 17 in such a manner that a front end 52a of the longitudinal floor member 52 is attached to the front cross member 13, and a rear end 52b of the longitudinal floor member 52 is attached to the rear cross member 14. In the battery pack 7, two sets of the battery modules 9 are juxtaposed in the right array, and two sets of the battery modules 9 are juxtaposed in the left array across the longitudinal floor member 52. The battery pack 7 is fixed to the longitudinal floor member 52 at the fixing point P by the bolt. The battery pack 7 is also fixed to the right side sill 11 and to the left side sill 12 individually at two points by the bolts.

Figure 12:
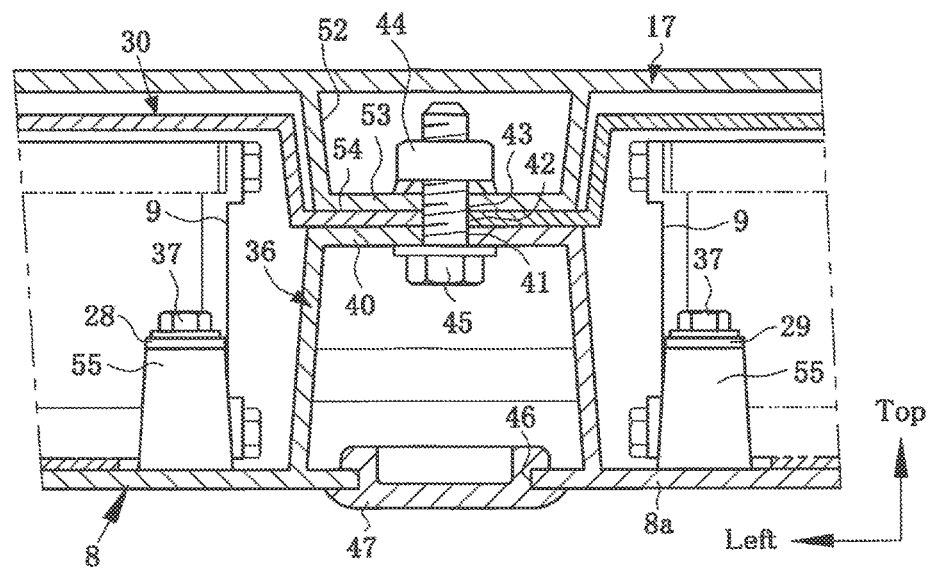
FIG. 12 is a cross-sectional view showing a cross-section of the longitudinal floor member shown in FIG. 11.

FIG. 12 shows a cross-section of the longitudinal floor member 52 in the width direction. As illustrated in FIG. 12, the longitudinal floor member 52 is formed integrally with the lower face of the floor panel 17 in such a manner as to have a rectangular cross-section in a linear depression 53. Alternatively, the longitudinal floor member 52 may also be formed separately from the floor panel 17 in such a manner as to have the linear depression 53, and attached to the lower face of the floor panel 17. The linear depression 53 of the longitudinal floor member 52 is also fitted into a longitudinal linear depression 54 formed on the lid 30. In this case, the battery reinforcement member 36 is arranged underneath the longitudinal floor member 52 in such a manner as to extend in the longitudinal direction while being fixed to the bottom 8a of the casing 8. In the example shown in FIG. 12, the longitudinal floor member 52, the lid 30, and the battery reinforcement member 36 are fixed to one another in a similar fashion as the example shown in FIG. 9. Alternatively, the battery reinforcement member 36 may also be arranged in such a manner as to extend in the width direction of the vehicle 1. In this case, the battery reinforcement member 36 may be fixed to the longitudinal floor member 52 and the lid 30 at an intersection between the longitudinal floor member 52 and the battery reinforcement member 36. In the example shown in FIG. 12, the fixing plates 28 of the battery modules 9 in the right array are individually fixed to installation portions 55 by the bolts 37, and the fixing plates 29 of the battery modules 9 in the left array are individually fixed to the installation portions 55 by the bolts 37.

Figure 13:
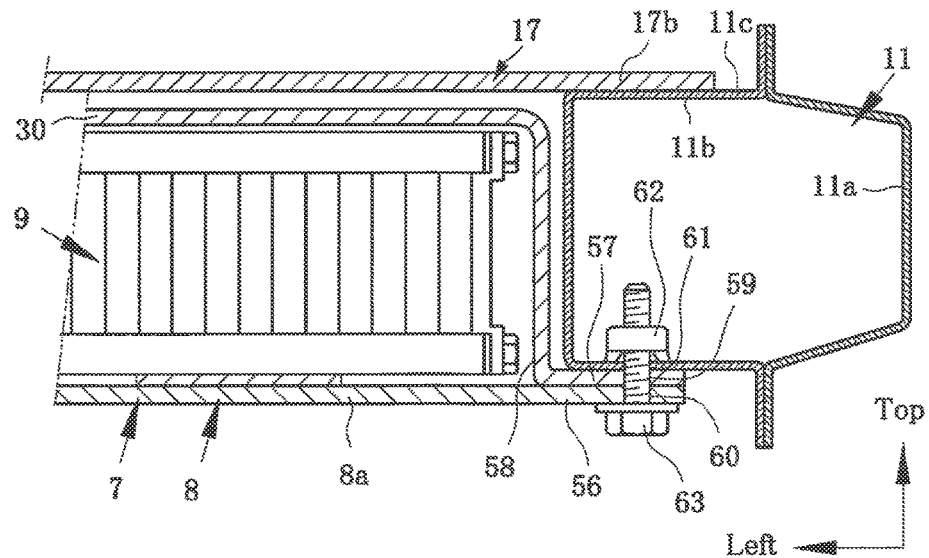
FIG. 13 is a cross-sectional view showing cross-sections of the side sill and the battery pack shown in FIG. 11.

FIG. 13 shows cross-sections of the right side sill 11 and the battery module 9 of the right array in the vehicle shown in FIG. 11. As illustrated in FIG. 13, an outer side sill 11a and an inner side sill 11b are coupled to form the right side sill 11 in such a manner as to create a hollow internal space in the right side sill 11. A right side end 17b of the floor panel 17 is fixed to an upper face of an upper wall 11c of the inner side sill 11b by welding or the like. Although not especially shown in FIG. 13, the left side end 17a of the floor panel 17 is also fixed to the left side sill 12 in a similar fashion.

In this case, the bottom 8a of the casing 8 on which the battery modules 9 are disposed are shaped into a flat plate, and the lid 30 covers the width ends and the top faces of the battery modules 9. An installation portion 56 is formed on the right end of the bottom 8a, and a flange 57 protrudes from an opening end 58 of the lid 30 toward the right side sill 11 to be overlapped on the installation portion 56. An installation hole 59 is formed on the flange 57 of the lid 30, and an installation hole 60 is formed on the installation portion 56. In addition, an installation hole 61 is formed on a bottom wall of the inner side sill 11b of the right side sill 11, and a weld nut 62 is welded on the inner surface of the inner side sill 11b around the installation hole 61. A bolt 63 is screwed into the weld nut 62 through the installation holes 60, 59, and 61 to fix the battery pack 7 to the right side sill 11. Although not especially shown in FIG. 13, a left side end of the battery pack 7 is also fixed to the left side sill 12 in a similar fashion.

Here, in the vehicle shown in FIG. 11, a plurality of the longitudinal floor members 52 may also be arranged between the right side sill 11 and the left side sill 12 according to need.

Figure 14:
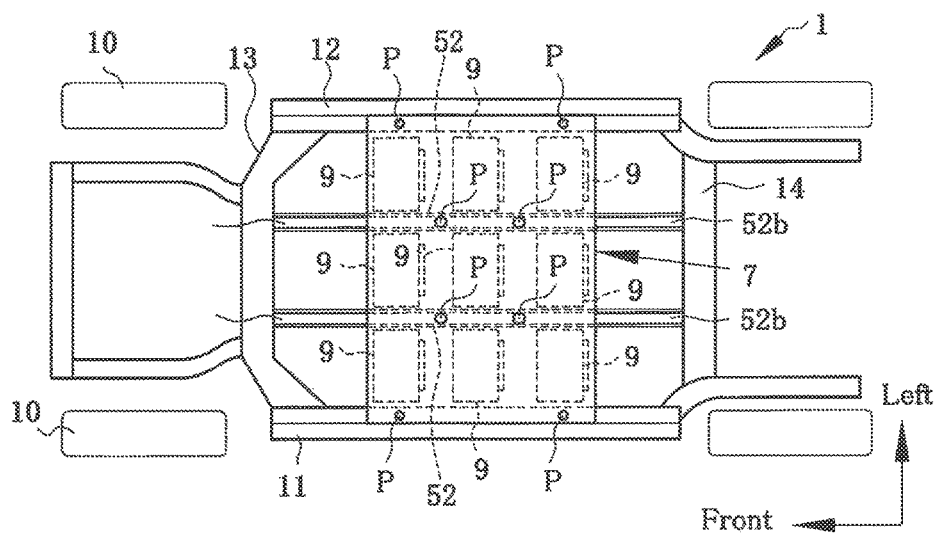
FIG. 14 is a schematic illustration showing an example of arranging two longitudinal floor members in the vehicle.

FIG. 14 shows still another example of the vehicle 1 in which three arrays of the battery modules 9 are arranged in the battery pack 7, and three sets of the battery modules 9 are juxtaposed in each array. In the vehicle 1 shown in FIG. 14, a right longitudinal floor member 52 is arranged between the right array and the middle array of the battery modules 9, and, a left longitudinal floor member 52 is arranged between the middle array and the left array of the battery modules 9. As the example shown in FIG. 11, the front end 52a of each of the longitudinal floor members 52 is attached to the front cross member 13, and the rear end 52b of each of the longitudinal floor members 52 is attached to the rear cross member 14.

In the example shown in FIG. 14, the battery pack 7 is fixed to the right side sill 11, the right longitudinal floor member 52, the left longitudinal floor member 52 and the left side sill 12 individually at two fixing points P by the bolts.

In the examples shown in FIGS. 11 and 14, the above-explained the cross members 15 and 16 may also be arranged in addition to the longitudinal floor member(s) 52.

Figure 15:
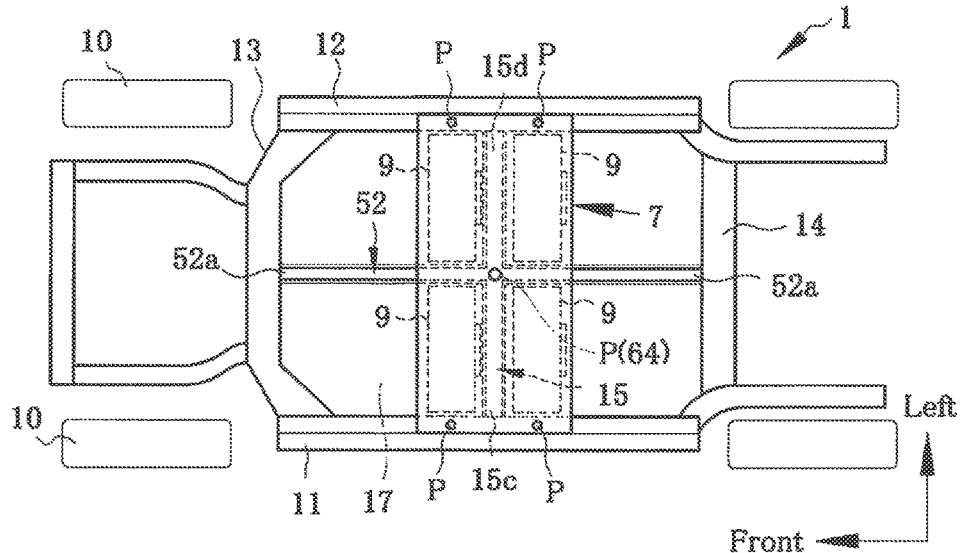
FIG. 15 is a schematic illustration showing an example of arranging the cross member and the longitudinal floor member in the vehicle.

FIG. 15 shows an example in which both the cross members and the longitudinal floor member are arranged underneath the floor panel 17. In the example shown in FIG. 15, the longitudinal floor member 52 is arranged between the right side sill 11 and the left side sill 12. As the example shown in FIG. 11, the longitudinal floor member 52 is arranged underneath the floor panel 17 in such a manner that the front end 52a of is attached to the front cross member 13, and the rear end 52b is attached to the rear cross member 14. According to the example shown in FIG. 15, in the battery pack 7, two sets of the battery modules 9 are juxtaposed in the right array, and two sets of the battery modules 9 are juxtaposed in the left array across the longitudinal floor member 52. The battery pack 7 is fixed to the right side sill 11 at two points by the bolts and to the left side sill 12 also at two points by the bolts, and the intermediate cross member 15 extends perpendicular to the longitudinal floor member 52 between the front row and the rear row of the battery module 9. A right end 15c of the intermediate cross member 15 is fixed to the right side sill 11, and a left end 15d of the intermediate cross member 15 is fixed to the left side sill 12.

Figure 16:
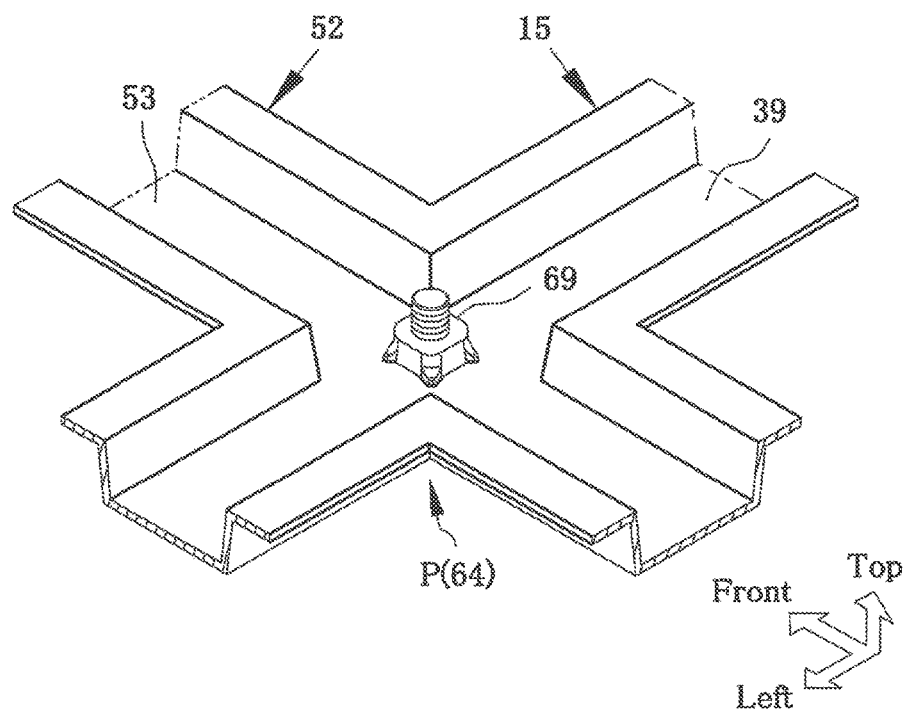
FIG. 16 is a perspective view showing an intersection between the cross member and the longitudinal floor member.

An intersection 64 between the longitudinal floor member 52 and the intermediate cross member 15 is shown in FIG. 16 in an enlarged scale. As illustrated in FIG. 16, the linear depression 39 having a rectangular cross-section is also formed in the intermediate cross member 15, and the linear depression 53 having e a rectangular cross-section is also formed in the longitudinal floor member 52.

Figure 17:
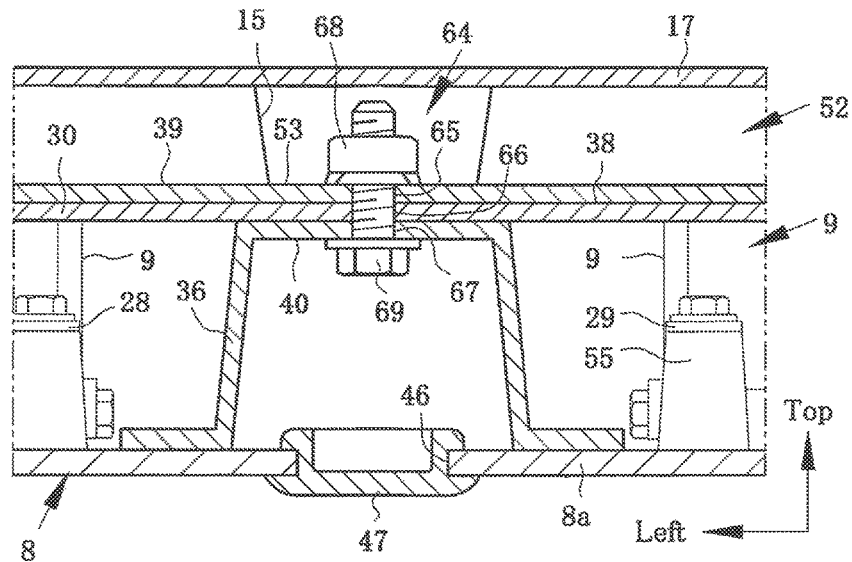
FIG. 17 is a cross-sectional view showing the intersection between the cross member and the longitudinal floor member.

FIG. 17 shows a cross-section of an intersection 64 between the intermediate cross member 15 and the longitudinal floor member 52 in the width direction of the vehicle 1. As illustrated in FIG. 17, the intermediate cross member 15 and the longitudinal floor member 52 are attached to the lower face of the floor panel 17, and an installation hole 65 is formed at the intersection 64. The casing 8 includes the bottom 8a on which the battery modules 9 and the battery reinforcement member 36 are disposed, and the lid 30 covering the battery modules 9. In the lid 30, the linear depression 54 is formed along the linear depression 39 of the intermediate cross member 15. The battery reinforcement member 36 extends in the longitudinal direction of the vehicle 1 and both ends of the battery reinforcement member 36 are attached to the inner faces of the casing 8. At the intersection 64, an installation hole 66 is formed on the linear depression 54 of the lid 30, and an installation hole 67 is formed on the top wall of the protrusion 40. In addition, a weld nut 68 is welded on an upper face of the linear depression 39 around the installation hole 65. Accordingly, the intermediate cross member 15, the lid 30, and the battery reinforcement member 36 are fixed to one another by screwing a bolt 69 into the weld nut 68 through the opening 46 of the floor panel casing 8 and the installation holes 67, 66 and 65. The opening 46 is closed by the grommet 47 after screwing a bolt 69 into the weld nut 68. Here, it is to be noted that the numbers of the intermediate cross member 15, the longitudinal floor member 52, and the battery modules 9 may be altered arbitrarily according to need.

Figure 18:
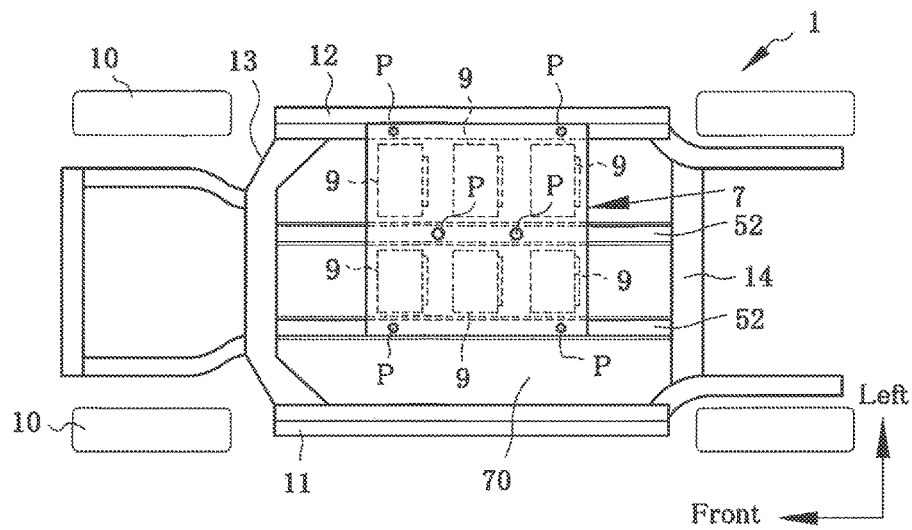
FIG. 18 is a schematic illustration showing an example of arranging a downsized battery pack in the vehicle.

FIG. 18 shows an example in which the battery pack 7 shown in FIG. 14 is downsized. According to the example shown in FIG. 18, in the battery pack 7, three sets of the battery modules 9 are arranged between the right longitudinal floor member 52 and the left longitudinal floor member 52, and three sets of the battery modules 9 are arranged between the left longitudinal floor member 52 and the left side sill 12. The battery pack 7 is fixed to the left side sill 12, the left longitudinal floor member 52, and the right longitudinal floor member 52 individually at two fixing points P by the bolts. In the example shown in FIG. 18, since each of the battery modules 9 is individually downsized, a length of the battery pack 7 is reduced so that a space 70 is created between the right longitudinal floor member 52 and right side sill 11. According to the example shown in FIG. 18, therefore, an exhaust pipe (not shown) may be arranged in the space 70 given that the vehicle 1 is provided with an engine.

Figure 19:
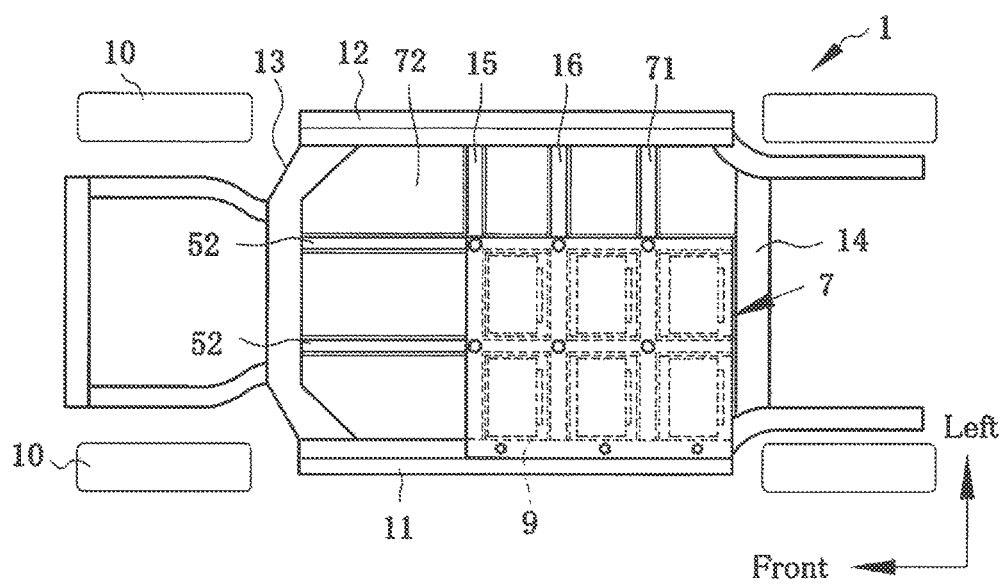
FIG. 19 is a schematic illustration showing an example of arranging a plurality of the cross members and a plurality of the longitudinal floor members in the vehicle.

FIG. 19 shows an example of the vehicle 1 in which the intermediate cross members are arranged in the vehicle 1 shown in FIG. 18. In the example shown in FIG. 19, the first intermediate cross member 15, the second intermediate cross member 16 and a third intermediate cross member 71 are arranged between the right side sill 11 and the left side sill 12. In the battery pack 7, three sets of the battery modules 9 are juxtaposed between the right side sill 11 and the right longitudinal floor member 52 across the second intermediate cross member 16 and a third intermediate cross member 71, and three sets of the battery modules 9 are juxtaposed between the right longitudinal floor member 52 and the left longitudinal floor member 52 across the second intermediate cross member 16 and a third intermediate cross member 71. The battery pack 7 is fixed to the right side sill 11, the right longitudinal floor member 52 and the left longitudinal floor member 52 individually at three fixing points P by the bolts. In the example shown in FIG. 19, a space 72 is created between the left longitudinal floor member 52 and the left side sill 12. According to the example shown in FIG. 19, therefore, the exhaust pipe (not shown) may be arranged in the space 72 given that the vehicle 1 is provided with an engine.

Although the above exemplary embodiments of the present application have been described, it will be understood by those skilled in the art that the present application should not be limited to the described exemplary embodiments, and various changes and modifications can be made within the spirit and scope of the present disclosure. For example, numbers of the cross members, floor members, may be altered arbitrarily according to need.

In addition, the battery mounting structures according to the foregoing examples may also be applied to hybrid vehicles and plug-in hybrid vehicles in which a prime mover includes an engine and at least one motor, and electric vehicles in which each wheel is individually driven by own motor (i.e., an in-wheel motor).

Further, the battery pack may also be fixed to the side sills by a rivet, or by welding or bonding.

What is claimed is:

1. A battery mounting structure for a vehicle, comprising:
a pair of frame members extending in a longitudinal direction of the vehicle while maintaining a predetermined clearance therebetween in a width direction of the vehicle;
a battery pack disposed between the frame members;
a floor panel supported by the frame members;
a first reinforcement member having a linear depression protruding downwardly that is disposed underneath the floor panel,
wherein the battery pack is situated underneath the floor panel, and
the battery pack includes a linear depression to which the linear depression of the first reinforcement member is fitted; and
a second reinforcement member extending along the linear depression of the battery pack in a casing of the battery pack, wherein the second reinforcement member directly contacts the linear depression of the battery pack.

2. The battery mounting structure for a vehicle as claimed in claim 1, wherein the battery pack includes a cell stack formed of a plurality of single cells that is disposed on both sides of the linear depression of the battery pack.

3. The battery mounting structure for a vehicle as claimed in claim 2,
wherein the cell stack includes a solid electrolyte, and
the battery pack is fixed to the frame members in such a manner that the single cells are juxtaposed in the width direction of the vehicle.

4. The battery mounting structure for a vehicle as claimed in claim 3, wherein the battery pack includes a battery module, comprising:
a pair of end plates holding the cell stack from both ends; and
a bundling member connecting the end plates to bundle the cell stack between the end plates.

5. The battery mounting structure for a vehicle as claimed in claim 4, wherein the battery module is arranged in such a manner that one of the pair of end plates extends parallel to a sidewall of a casing of the battery pack.

6. The battery mounting structure for a vehicle as claimed in claim 1, wherein the first reinforcement member includes:
a cross member extending between the frame members in a width direction of the vehicle, and
a longitudinal floor member extending between the frame members in a longitudinal direction of the vehicle.

7. The battery mounting structure for a vehicle as claimed in claim 6,
wherein a plurality of the first reinforcement member are arranged in the vehicle at predetermined intervals, and
cell stacks are arranged between adjacent first reinforcement members of the plurality of first reinforcement members.

8. The battery mounting structure for a vehicle as claimed in claim 1, wherein the first reinforcement member is integrated with the floor panel.

9. The battery mounting structure for a vehicle as claimed in claim 1, further comprising:
a second reinforcement member extending along the linear depression of the battery pack in a casing of the battery pack; and
a fixing member that fixes the second reinforcement member, the linear depression of the battery pack and the first reinforcement member.

10. The battery mounting structure for a vehicle as claimed in claim 9, wherein the second reinforcement member is integrated with the casing.

11. The battery mounting structure for a vehicle as claimed in claim 1, wherein the floor panel comprising an opening above the linear depression of the first reinforcement member.

12. The battery mounting structure for a vehicle as claimed in claim 11, further comprising a grommet in the opening.

* * * * *